United States Patent
Bhagwan et al.

(10) Patent No.: US 10,187,199 B2
(45) Date of Patent: Jan. 22, 2019

(54) AGGREGATION BASED ON SPLAYED DATA

(71) Applicant: Microsoft Technology Licensing, LLC, Redmond, WA (US)

(72) Inventors: Ranjita Bhagwan, Bangalore (IN); Nishanth Chandran, Bangalore (IN); Ramachandran Ramjee, Bangalore (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 77 days.

(21) Appl. No.: 15/331,715

(22) Filed: Oct. 21, 2016

(65) Prior Publication Data

US 2018/0076951 A1 Mar. 15, 2018

(30) Foreign Application Priority Data

Sep. 9, 2016 (IN) .............................. 201641030880

(51) Int. Cl.
*H04L 29/06* (2006.01)
*H04L 9/00* (2006.01)

(52) U.S. Cl.
CPC .......... *H04L 9/008* (2013.01); *H04L 63/0428* (2013.01)

(58) Field of Classification Search
CPC .............................. H04L 9/008; H04L 63/0435
See application file for complete search history.

(56) References Cited

U.S. PATENT DOCUMENTS

| 8,626,749 | B1 | 1/2014 | Trepetin et al. |
| 8,635,465 | B1 | 1/2014 | Juels et al. |
| 9,087,212 | B2 | 7/2015 | Balakrishnan et al. |
| 9,143,317 | B2 | 9/2015 | Chevallier-Mames et al. |
| 9,213,764 | B2 | 12/2015 | Kerschbaum et al. |

(Continued)

FOREIGN PATENT DOCUMENTS

EP 1146411 A1 10/2001

OTHER PUBLICATIONS

Vaswani, et al., "Information Flows in Encrypted Databases," In Journal of Computing Research Repository, May 2016, pp. 1-12.

(Continued)

*Primary Examiner* — John B King
(74) *Attorney, Agent, or Firm* — Schwegman Lundberg & Woessner, P.A.

(57) ABSTRACT

An encryption system stores encrypted values for aggregation is provided. The encryption system accesses an input set with input values. For each distinct value in the input set of input values, the encryption system generates an output set with an encrypted output value corresponding to each input value. The encryption system sets the encrypted output value for a corresponding input value to an encryption of an indicator of a match when the corresponding input value is the same as that distinct value. Otherwise, the encryption sets the encrypted output value for the corresponding input value to an encryption of an indicator of no match. The encrypted output values can then be aggregated to generate an encrypted aggregation based on input values that match, and the encrypted aggregation can be decrypted to generated a decrypted aggregation based on the input values that match.

20 Claims, 7 Drawing Sheets

(56) References Cited

U.S. PATENT DOCUMENTS

| | | | |
|---|---|---|---|
| 2007/0171050 A1* | 7/2007 | Westhoff | H04W 12/02 340/539.22 |
| 2011/0145593 A1 | 6/2011 | Auradkar et al. | |
| 2011/0264920 A1* | 10/2011 | Rieffel | H04L 9/008 713/189 |
| 2012/0084554 A1 | 4/2012 | Van gorp et al. | |
| 2013/0111205 A1 | 5/2013 | Biswas | |
| 2013/0191650 A1* | 7/2013 | Balakrishnan | G06F 21/6227 713/190 |
| 2014/0101438 A1 | 4/2014 | Elovici et al. | |
| 2015/0039912 A1* | 2/2015 | Payton | H04L 9/008 713/193 |
| 2015/0295716 A1 | 10/2015 | Liu | |
| 2016/0147779 A1* | 5/2016 | Eguro | G06F 17/30082 707/694 |
| 2017/0103217 A1* | 4/2017 | Arasu | G06F 21/606 |
| 2017/0150347 A1* | 5/2017 | Kowalevicz | H04W 12/02 |
| 2017/0235969 A1* | 8/2017 | Kamara | G06F 21/6227 713/159 |
| 2017/0272235 A1 | 9/2017 | Bhagwan et al. | |
| 2017/0308580 A1* | 10/2017 | Naganuma | G06F 17/30513 |
| 2018/0006820 A1* | 1/2018 | Arasu | H04L 9/3234 |

OTHER PUBLICATIONS

C, David, "Five Things to Know about Databases that Leverage Partially Homomorphic Encryption," Retrieved on: Jul. 22, 2016 Available at: https://gab41.lab41.org/five-things-to-know-about-databases-that-leverage-partially-homomorphic-encryption-794b1e49119b#.hhdend2nf.

Tsoutsos, et al., "HEROIC: homomorphically EncRypted one instruction computer," In Proceedings of the conference on Design, Automation & Test in Europe, Mar. 24, 2014, 6 pages.

Wang, et al., "Towards Practical Private Processing of Database Queries over Public Data with Homomorphic Encryption," In Technical Report of University of California, Department of Computer Science, Nov. 2011, pp. 1-13.

Lacharite, et al., "A note on the optimality of frequency analysis vs. lp-optimization," In Journal of Cryptology ePrint Archive, Mar. 9, 2016, pp. 1-3.

Akin, et al., "On the Difficulty of Securing Web Applications using CryptDB," In Journal of Cryptology ePrint Archive, Mar. 18, 2015, 8 pages.

Liu, et al., "Ensuring Data Storage Security against Frequency-Based Attacks in Wireless Networks," In Proceedings of 6th IEEE International Conference on Distributed Computing in Sensor Systems, Jun. 21, 2010, pp. 201-215.

"Big Data Benchmark," Retrieved on: Aug. 3, 2016 Available at: https://amplab.cs.berkeley.edu/benchmark/.

"Big Data Analytics over Encrypted Datasets with Seabed," Retrieved on: Aug. 3, 2016 Available at: https://sites.google.com/site/seabedosdi2016/tr.pdf.

"Apache Spark™ is a fast and general engine for large-scale data processing," Retrieved on: Aug. 3, 2016 Available at: http://spark.apache.org/.

"Google Protocol Buffers," Retrieved on: Aug. 3, 2016 Available at: https://developers.google.com/protocol-buffers/.

"PowerBI," Retrieved on: Aug. 3, 2016 Available at: https://powerbi.microsoft.com/en-us/features/.

Deutsch, P., "DEFLATE Compressed Data Format Specification version 1.3," Published on: May 1996 Available at: https://tools.ietf.org/html/rfc1951.

"Tableau Online," Retrieved on: Aug. 3, 2016 Available at: http://www.tableau.com/products/cloud-bi.

"IBM Analytics," Retrieved on: Aug. 3, 2016 Available at: http://www.ibm.com/analytics/us/en/.

Arasu, et al., "Orthogonal Security with Cipherbase," In Proceedings of 6th Biennial Conference on Innovative Data Systems Research, Jan. 6, 2013, 10 pages.

"ARM Security Technology Building a Secure System using TrustZone® Technology," In White Paper of ARM Architecture for the Digital World, Retrieved on: Aug. 3, 2016, 108 pages.

Bajaj, et al., "TrustedDB: A Trusted Hardware-Based Database with Privacy and Data Confidentiality," In Journal of IEEE Transactions on Knowledge and Data Engineering, vol. 26, Issue 3, Mar. 2014, pp. 752-765.

Bellare, et al., "Deterministic and efficiently searchable encryption," In Proceedings of the 27th annual international cryptology conference on Advances in cryptology, Aug. 19, 2007, 18 pages.

Bhagwan, et al., "Adtributor: Revenue debugging in advertising systems," In Proceedings of the 11th USENIX Conference on Networked Systems Design and Implementation, Apr. 2, 2014, pp. 43-55.

Boldyreva, et al., "Order-preserving symmetric encryption," In Proceedings of the 28th Annual International Conference on Advances in Cryptology: the Theory and Applications of Cryptographic Techniques, Apr. 16, 2009, pp. 224-241.

Boneh, et al., "Evaluating 2-dnf formulas on ciphertexts," In Proceedings of the Second international conference on Theory of Cryptography, Feb. 10, 2005, pp. 325-341.

Chambi, et al., "Better bitmap performance with roaring bitmaps," In Journal of Software: practice and experience, vol. 46, Issue 5, Apr. 2015, pp. 1-11.

Chenette, et al., "Practical order-revealing encryption with limited leakage," In Proceedings of the 23rd International Conference on Fast Software Encryption, Mar. 20, 2016, pp. 1-27.

Costan, et al., "Intel sgx explained," In Journal of IACR Cryptology ePrint Archive, Apr. 6, 2014, pp. 1-117.

Davenport, et al., "SGX: the good, the bad and the downright ugly," In Virus Bulletin, Jan. 17, 2014, 4 pages.

Dinh, et al., "M2R: Enabling stronger privacy in mapreduce computation," In Proceedings of the 24th USENIX Conference on Security Symposium, Aug. 12, 2015, pp. 447-462.

Ge, et al., "Answering aggregation queries in a secure system model," In Proceedings of the 33rd international conference on Very large data bases, Sep. 23, 2007, pp. 519-530.

Gentry, Craig, "Fully homomorphic encryption using ideal lattices," In Proceedings of the 41st Annual ACM Symposium on Theory of Computing, May 31, 2009, pp. 169-178.

Gentry, et al., "Homomorphic Evaluation of the AES Circuit," In Proceedings of 32nd Annual Cryptology Conference, Aug. 19, 2012, pp. 850-867.

Gentry, et al., "Homomorphic Evaluation of the AES Circuit (Updated Implementation)," Published on: Jan. 3, 2015 Available at: https://eprint.iacr.org/2012/099.pdf.

Goldreich, et al., "Software Protection and Simulation on Oblivious RAMs," In Journal of ACM, vol. 43, Issue 3, May 1996, pp. 431-473.

"CryptoCards," Retrieved on: Aug. 3, 2016 Available at: http://www-03.ibm.com/security/cryptocards/.

Kambatla, et al., "Trends in big data analytics," In Journal of Parallel and Distributed Computing, vol. 74, Issue 7, Feb. 2, 2014, pp. 2561-2573.

Lee, et al., "The Unified Logging Infrastructure for Data Analytics at Twitter," In Proceedings of 38th International Conference on Very Large Data Bases, vol. 5, Issue 12, Aug. 27, 2012, pp. 1771-1780.

Lemire, et al., "Decoding billions of integers per second through vectorization," In Journal of Software—Practice and Experience, vol. 45, Issue 1, Jan. 2015, pp. 1-29.

McKeen, et al., "Innovative Instructions and Software Model for Isolated Execution," In Proceedings of 2nd International Workshop on Hardware and Architectural Support for Security and Privacy, Jun. 24, 2013, pp. 1-8.

Naveed, et al., "Inference Attacks on Property-Preserving Encrypted Databases," In Proceedings of 22nd ACM SIGSAC Conference on Computer and Communications Security, Oct. 12, 2015, pp. 644-655.

Ostrovsky, Rafail, "Efficient Computation on Oblivious RAMs," In Proceedings of Twenty-Second Annual ACM Symposium on Theory of Computing, May 13, 1990, pp. 514-523.

Paillier, Pascal, "Public-Key Cryptosystems Based on Composite Degree Residuosity Classes," In Proceedings 17th International

(56) References Cited

OTHER PUBLICATIONS

Conference on Theory and Application of Cryptographic Techniques, May 2, 1999, pp. 223-238.
Popa, et al., "CryptDB: Protecting Confidentiality with Encrypted Query Processing," In Proceedings of Twenty-Third ACM Symposium on Operating Systems Principles, Oct. 23, 2011, pp. 85-100.
Schuster, et al., "VC3: Trustworthy Data Analytics in the Cloud," In Proceedings of IEEE Symposium on Security and Privacy, May 18, 2015, pp. 38-54.
Sumbaly, et al., "The "Big Data" Ecosystem at LinkedIn," In Proceedings of ACM SIGMOD International Conference on Management of Data, Jun. 22, 2013, pp. 1125-1134.
Tu, et al., "Processing Analytical Queries over Encrypted Data," In Proceedings of 39th International Conference on Very Large Data Bases, vol. 6, Issue 5, Aug. 26, 2013, pp. 289-300.
IN. Application No. 201641009424, Singh, et al., "A Method for Aggregation on Encrypted Numerical Data," Filed Date: Mar. 17, 2016.
Catalano, et al., "Using Linearly-Homomorphic Encryption to Evaluate Degree-2 Functions on Encrypted Data", In Proceedings of 22nd ACM SIGSAC Conference on Computer and Communications Security, Oct. 12, 2015., pp. 1518-1529.
Christen, Peter, "Data Matching", In Publication of Springer-Verlag Berlin Heidelberg, Retrieved Date: Jan. 8, 2016, 279 Pages.
Dong, et al., "A Fast Secure Dot Product Protocol with Application to Privacy Preserving Association Rule Mining", In Proceedings of 18th Pacific-Asia Conference on Knowledge Discovery and Data Mining, May 13, 2014, pp. 606-617.
Grofig, et al., "Privacy by Encrypted Databases", In Proceedings of Second Annual Privacy Forum, May 20, 2014., pp. 56-69.
Islam, et al., "Access Pattern disclosure on Searchable Encryption: Ramification, Attack and Mitigation", In Proceedings of 19th Annual Network and Distributed System Security Symposium, Feb. 5, 2012, 15 Pages.
Lim, et al., "Faster Secure Arithmetic Computation Using Switchable Homomorphic Encryption", In the Archive of International Association for Cryptologic Research, Cryptology ePrint, Jul. 11, 2014, 25 Pages.
Naehrig, et al., "Can Homomorphic Encryption be Practical?", In Proceedings of the 3rd ACM Workshop on Cloud Computing Security Workshop, Oct. 21, 2011, pp. 113-124.
"International Search Report and Written Opinion Issued in PCT Application No. PCT/US2017/021698", dated Jun. 2, 2017, 13 Pages.
Sharma, Iti, "Fully Homomorphic Encryption Scheme with Symmetric Keys", A thesis Submitted in Partial fulfillment of the Requirements of the University of Rajasthan for the Degree of Master of Technology, Oct. 9, 2013, 64 Pages.
Wang, et al., "Is Homomorphic Encryption the Holy Grail for Database Queries on Encrypted Data?", In Technical Report, Feb. 1, 2012, 18 Pages.
Zhao, et al., "Secure Genomic Computation through Site-Wise Encryption", In Proceedings of AMIA Joint Summits on Translational Science, Mar. 25, 2015, pp. 227-231.

\* cited by examiner

| ID | Gender | Salary |
|------|--------|--------|
| 0536 | M | 40,000 |
| 1024 | F | 52,000 |
| 3610 | F | 27,000 |
| 2498 | M | 35,000 |
| 0510 | M | 60,000 |
| 9801 | M | 31,000 |
| 7678 | M | 22,000 |

110

| ID | Gender | | Salary |
|------|------|------|--------|
|      | Male | Female | |
| 0536 | H(1) | H(0) | 40,000 |
| 1024 | H(0) | H(1) | 52,000 |
| 3610 | H(0) | H(1) | 27,000 |
| 2498 | H(1) | H(0) | 35,000 |
| 0510 | H(1) | H(0) | 60,000 |
| 9801 | H(1) | H(0) | 31,000 |
| 7678 | H(1) | H(0) | 22,000 |

120

| ID | Gender | | Salary | |
|------|------|------|------|------|
|      | Male | Female | Male | Female |
| 0536 | H(1) | H(0) | H(40,000) | (H) 0 |
| 1024 | H(0) | H(1) | (H) 0 | H(52,000) |
| 3610 | H(0) | H(1) | (H) 0 | H(27,000) |
| 2498 | H(1) | H(0) | H(35,000) | (H) 0 |
| 0510 | H(1) | H(0) | H(60,000) | (H) 0 |
| 9801 | H(1) | H(0) | H(31,000) | (H) 0 |
| 7678 | H(1) | H(0) | H(22,000) | (H) 0 |

AGGREGATION BASED ON SPLAYED DATA

BACKGROUND

A cloud data center may provide cloud computing services to various computing systems such as desktops, laptops, tablets, smartphones, embedded computers, point-of-sale terminals, and so on. A cloud data center may have many thousands of servers and storage devices and provide various software products such as operating systems, databases, and applications. Rather than maintaining their own data centers, many enterprises subscribe as customers of a database service of a cloud data center to store and process their data. For example, a retail company may subscribe to a database service to store records of the sales transactions at the company's stores and use an interface provided by the database service to run queries to help in analyzing the sales data. As another example, a utility company may subscribe to a database service for storing meter readings collected from the meters of its customers. As another example, a governmental entity may subscribe to a database service for storing and analyzing tax return data of millions of taxpayers.

Enterprises that subscribe to such cloud-based database services want to ensure the privacy of their data. Although cloud data centers employ many sophisticated techniques to help preserve the privacy of customer data, parties seeking to steal such customer data are continually devising new counter-techniques to access the data. To help ensure the privacy of their data, many customers may encrypt their data locally before sending their data for storage by a database service. For example, each point-of-sale terminal of a retail company may encrypt the sale amount of each transaction and send the sale amount only in an encrypted form to the database service as a record of the transaction. If the retail company wants to determine the total sale amount for each store, the encrypted sale amounts for each store would need to be downloaded to a company computer and then decrypted. The decrypted sale amounts for each store could then be added together to generate the total sale amount for each store.

If a customer were to use a homomorphic encryption of data, then the downloading and decrypting of all the sales data could be avoided. Homomorphic encryption has the characteristic that a computation performed on the encrypted data generates an encrypted result that, when decrypted, equals the same result as if the computation was performed on the unencrypted data. For example, if the retail company homomorphically encrypts its sale amounts, then the database service could add the encrypted sale amounts for each store to generate an encrypted total sale amount for each store. The retail company need only download the encrypted total sale amount for each store and decrypt those total sale amounts.

A problem occurs, however, when an aggregation is to be performed for a subset of the sales amounts. For example, if the retail company has stores in multiple countries, then in order to aggregate the sales amounts for the stores in a certain country, the database service would need to know in which country each store is located. To allow such aggregation, the retail company would "deterministically" encrypt the country for each store. A deterministic encryption will always generate the same encrypted value for a given value. So a database table with a row for each store and columns for country and sales amount will have the same value in the country column for each row whose store is in the same country. By using a deterministic encryption, the database service can generate a total sales amount for each country and return each encrypted aggregation along with the encrypted country to the customer. The customer can then decrypt each encrypted aggregation and its corresponding encrypted country to determine the sales amount for each country. In addition, the database service can generate a count of the number of stores in each country. The retail company could then calculate the average sale for a store for each country.

Although homomorphic encryption allows the aggregation of encrypted data to be performed by the database service and thus avoids the downloading of the unaggregated encrypted data, homomorphic encryption can be very computationally expensive. Homomorphic encryption schemes typically use complex mathematical operations such as multiplications, exponentiations, matrix operations, and so on. As a result, many organizations either choose not to use homomorphic encryption or need to expend significant amounts of money purchasing additional computational power that is needed to support homomorphic encryption.

Although deterministic encryption allows aggregations on subsets of data, deterministic encryptions are susceptible to frequency attacks. A frequency attack allows an attacker to gain knowledge of the unencrypted data by examining the corresponding deterministically encrypted data. For example, an attacker with access to the country column of the table for a retail company could determine the country distribution of the stores, although the attacker would not be able to tell which stores are in which country. If, however, the attacker knew that a certain country had the largest number of stores, then the attacker could identify the most frequent encrypted country value and know that that value is an encryption for that certain country. Knowing exactly how many stores are in that certain country may be useful information in itself. However, knowing the encrypted country value for a certain country can be useful to help break the encryption scheme.

SUMMARY

An encryption system stores encrypted values for aggregation is provided. The encryption system accesses an input set with input values. For each distinct value in the input set of input values, the encryption system generates an output set with an encrypted output value corresponding to each input value. The encryption system sets the encrypted output value for a corresponding input value to an encryption of an indicator of a match when the corresponding input value is the same as that distinct value. Otherwise, the encryption sets the encrypted output value for the corresponding input value to an encryption of an indicator of no match. The encrypted output values can then be aggregated to generate an encrypted aggregation based on input values that match, and the encrypted aggregation can be decrypted to generated a decrypted aggregation based on the input values that match.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION

FIG. 1 is a diagram that illustrates the splaying of a gender column and a salary column.

DETAILED DESCRIPTION

Figure 2:
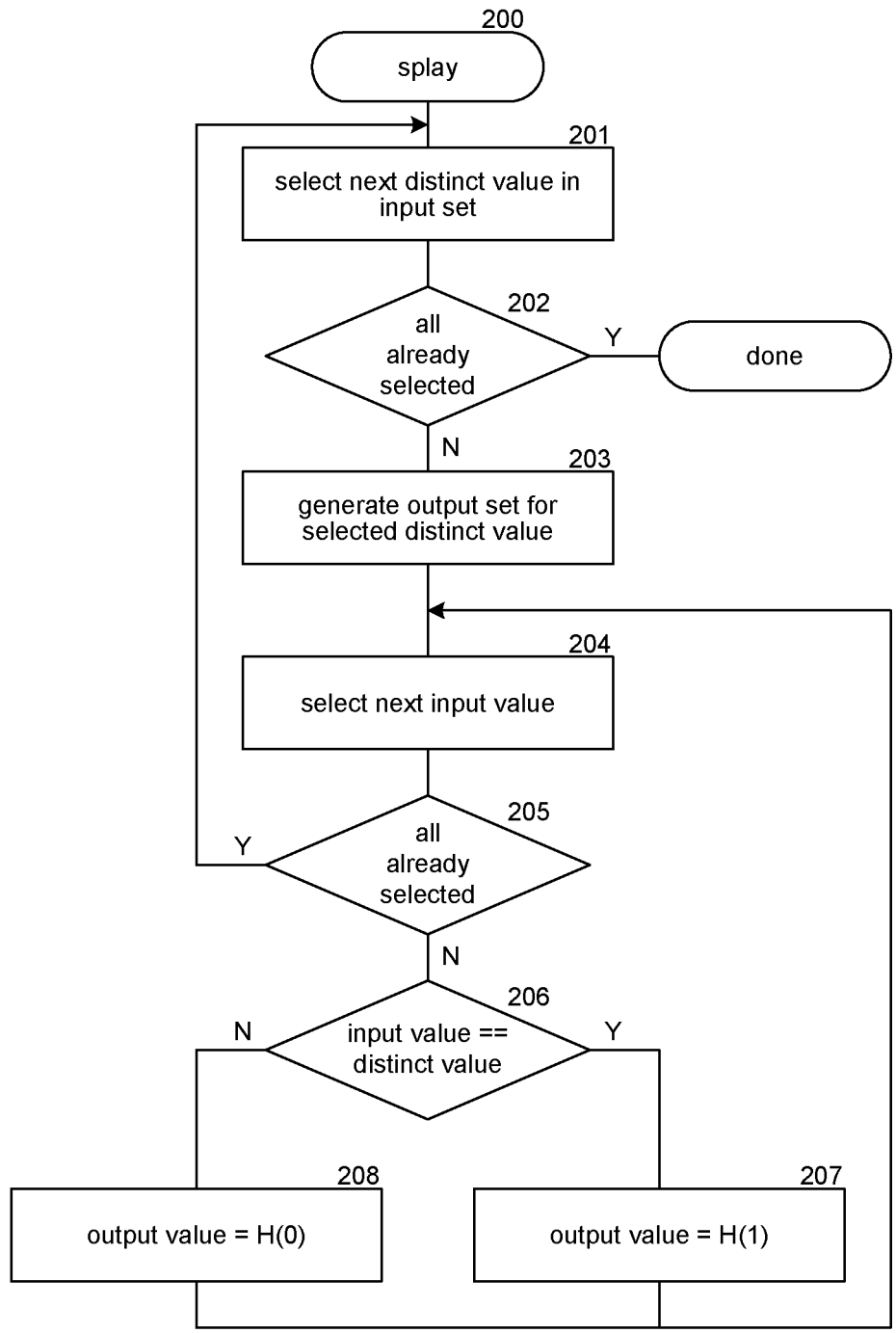
FIG. 2 is a flow diagram that illustrates overall processing of a splay component of the encryption system in some embodiments.

A method and system for encrypting data to help prevent frequency attacks while allowing aggregation on subsets of the data is provided. In some embodiments, an encryption system accesses an input set with input values that are to be the basis of the aggregation. For example, the input set may be a gender column of a table of a database that indicates the gender associated with each row of the table. For each distinct value in the input set of input values, the encryption system generates an output set with an output value corresponding to each input value. Continuing with the gender column example, since gender has two distinct values (i.e., male and female), the encryption system generates a gender-male column and a gender-female column, which may be considered sub-columns of the gender column. Each sub-column has the same number of rows as the gender column. The sub-columns may be added to the database to replace the gender column or be in addition to the gender column.

For each output set for a distinct value, the encryption system sets the output values to a non-deterministic homomorphic encryption of an indicator of a match with that distinct value (e.g., one) when the corresponding input value of the input set is that distinct value. Otherwise, the encryption system sets the input value to a non-deterministic encryption of an indicator of no match with that distinct value (e.g., zero). For example, for the gender-male column, the encryption system sets the value of each row corresponding to a male to an encryption of one and the value in the other rows to an encryption of zero. For the gender-female column, the encryption system sets the value of each row corresponding to a female to an encryption of one and the value in the other rows to an encryption of zero. Since the values of the gender column are spread across multiple sub-columns, this process is referred to as splaying the column.

Once the column is splayed, the encryption system can generate an encrypted count of males by aggregating the encrypted values of the gender-male column and an encrypted count of females by aggregating the encrypted values of the gender-female column. To generate an encrypted count of males, a database system may receive a Structured Query Language ("SQL") query such as:

Select Count(Gender) where Gender=male.

The database system may convert the SQL query to:

Select Sum(Gender-Male).

The query result is thus generated by aggregating the encrypted values of the gender-male column. Moreover, since the encryption is a non-deterministic encryption, the values of the gender-male columns and gender-female columns are not susceptible to a frequency attack.

FIG. 1 is a diagram that illustrates the splaying of a gender column and a salary column. Table 110 includes an identifier column, a gender column, and a salary column Table 120 include a gender-male column and a gender-female column that replaces the gender column of table 110. The value of each row in the gender-male column and the gender-female column is set to a value based on the value in the corresponding row of the gender column indicating a male or female. For example, in the first row of table 120, the value in the gender-male column is set to an encryption of one (i.e., H(1)) and the value in the gender-female column is set to an encryption of zero (i.e., (H(0)). In the second row of table 120, the value in the gender-male column is set to an encryption of zero (i.e., H(0)) and the value in the gender-female column is set to an encryption of one (i.e., (H(1)). Once the gender-male column and the gender-female column are generated, the number of rows corresponding to males can be determined by adding all the encrypted values in the gender-male column and then decrypting the sum. The number of rows corresponding to females can be determined by adding all the encrypted values in the gender-female column and then decrypting the sum. The adding of the encrypted values can be performed by a database service and provided to a customer of the database service for decryption.

In some embodiments, an encryption system allows encrypted values to be aggregated based on one or more characteristics of the values. The values may be indicators of another characteristic or a measure that is a numerical value. For example, the other characteristic may be whether a worker is a manager, and a measure may be the currency amount of the sales of a store or the salary of a worker. A characteristic of a manager may be gender of the manager, a characteristic of the currency amount of sales of a store may be the country in which the store is located, and a characteristic of the salary of a worker may be the gender of the worker. The aggregation system accesses an input set of input values and accesses a characteristic associated with each input value For example, the input set may be a salary column of a table of a database that indicates a salary of the worker associated with a row of the table, and the characteristic may be the characteristic value in a characteristic set that indicates the gender of the worker associated with a row. As another example, the characteristic may be whether the salary is above a certain currency amount. For each distinct value in the characteristic set of characteristic values, the encryption system generates an output set with an output value corresponding to each input value. Continuing with the salary column example, since gender has two distinct values, the encryption system generates a salary-male column and a salary-female column, which may be considered sub-columns of the gender column. Each sub-column has the same number of rows as the salary column. The sub-columns may be added to the database to replace the salary column or be in addition to the salary column. As another example, if the input values indicate whether a worker is a manager and the characteristic is gender, then the encryption system generates a manager-male column and a manager-female column.

For each output set for a distinct value, the encryption system sets the output values to a non-deterministic (or deterministic) homomorphic encryption of the input values when the corresponding characteristic value is that distinct value. Otherwise, the encryption system sets the input value to an non-deterministic (or deterministic) encryption of an indicator of no match with that distinct value (e.g., zero). (A deterministic encryption may be used when just knowing how many salaries are the same is unlikely to be of use to an attacker.) For example, for the salary-male column, the encryption system sets the value of each row corresponding to a male to an encryption of the salary and the value in the other rows to an encryption of zero. For the salary-female column, the encryption system sets the value of each row corresponding to a female to an encryption of the salary and the value in the other rows to an encryption of zero. The salary column is thus splayed across multiple sub-columns.

Once the column is splayed, the encryption system can generate an encrypted sum of the salary of males by aggregating the encrypted values of the salary-male column and an encrypted sum of the salary of females by aggregating the encrypted values of the salary-female column. A database system may receive a SQL query such as:

Select Sum(Salary) where Gender=male.

The database system may convert the SQL query to:

Select Sum(Salary-Male).

The query result is thus generated by aggregating the encrypted values of the salary-male column. If, for example, the average salary of males and the average salary of females are to be determined, the encryption system may generate a count of the males and females from the gender-male column and gender-female column.

Referring to FIG. 1, table 130 include a salary-male column and a salary-female column that replace the salary column of table 110. The value of each row in the salary-male column and the salary-female column is set to an encryption of the salary or zero depending on whether the worker associated with the row is male or female. For example, in the first row of table 130, the value in the salary-male column is set to an encryption of 40,000 (i.e., H(40,000)) and the value in the salary-female column is set to an encryption of zero (i.e., (H(0)). In the second row of table 130, the value in the salary-male column is set to an encryption of zero (i.e., H(0)) and the value in the salary-female column is set to an encryption of 52,000 (i.e., (H(52,000)). Once the salary-male column and the salary-female column are generated, the total salary for males can be determined by adding all the encrypted values in the salary-male column and then decrypting the sum. The total salary for females can be determined by adding all the encrypted values in the salary-female column and then decrypting the sum.

In some embodiments, the encryption system may use an additively symmetric homomorphic encryption ("ASHE") to encrypt the input values to generate a splayed column in a process that is referred to as splayed ASHE ("SPLASHE"). To generate an ASHE, the encryption system of a data source system may homomorphically encrypt a number using a number identifier associated with that number. For example, if the data source system is a point-of-sale terminal of a store of a retail company and the number represents the sale amount of a transaction, then the number identifier may be a combination of a store identifier and a record identifier for that transaction. To encrypt the number, the encryption system generates a random value that is a function of the number identifier associated with the number. The encryption system generates the random value by applying a pseudorandom function ("PRF") to a symmetric key and the number identifier. The encryption system may use any type of pseudorandom function. For example, the encryption system may use the Advanced Encryption Standard ("AES") algorithm or the Data Encryption Standard ("DES") algorithm as the pseudorandom function to generate the random value. Since an encryption algorithm is used to generate the random value in some embodiments, the random value generated by the pseudorandom function may be referred to as an "encryption of the number identifier." Continuing with the retail company example, if the store identifier is 10 and the transaction identifier is a numeric representation of date and time (e.g., seconds since 1900), then the number identifier of the sale amount may have 10 in its most significant bits and the numeric representation of date and time in its least significant bits. The encryption of the number identifier may be represented as E(ID), where ID represents the number identifier and E represents the PRF algorithm. The encryption system generates the encrypted number by performing a mathematical operation with the number and the encrypted number identifier (i.e., PRF output) as operands. The mathematical operation has a corresponding inverse mathematical operation that is used for decryption. The number can be decrypted from the encrypted number by performing the inverse mathematical operation with the encrypted number and the encrypted number identifier (i.e., PRF output) as operands. The encrypted number may be represented as follows:

$E(\text{number}) = \text{number} - E(\text{ID})$ and the decrypted number may be represented as:

$\text{number} = E(\text{number}) + E(\text{ID})$ where addition is the inverse of subtraction. The operations take place in a mathematical group (e.g., for integers mod (n) from some integer n). The encryption system may encrypt any quantity of numbers using the number identifier of each number. Once the encryption system encrypts a number, it can send the encrypted number to a cloud data center for secure storage.

In some embodiments, the encrypted numbers that have been encrypted with subtraction (or addition) as the mathematical operation can be added together at a cloud data center to generate an aggregation of the encrypted numbers. The cloud data center may receive a request for the aggregation (e.g., a query) from a data consumer system (e.g., management system of a store) that executes the encryption system. For example, if the cloud data center stores the encrypted sale amount for each transaction of a store, the cloud data center can add all the encrypted sale amounts for the store to generate an aggregation that is the sum of the encrypted sale amounts for that store. The sum of the encrypted numbers may be represented as follows:

$$A(E(\text{number}(1 \ldots n))) = \sum_{i=1}^{n} E(\text{number}_i)$$

where A represents the aggregation and $\text{number}_i$ represents the i-th number. When an aggregation is received, the encryption system can decrypt the aggregation of the encrypted numbers by performing the inverse mathematical operation (e.g., addition) for each number to reverse the mathematical operation (e.g., subtraction) used to encrypt the numbers. If the mathematical operation is subtraction, the decrypting of a summation aggregation of the encrypted numbers with the inverse mathematical operation of addition may be represented as follows:

$$A(\text{number}(1 \ldots n)) = A(E(\text{number}(1 \ldots n))) + \sum_{i=1}^{n} E(ID_i)$$

where $ID_i$ represents the number identifier of the i-th number.

Although the encryption system is described in the context of supporting an aggregation that is a summation, the aggregation can be another type of aggregation. For example, if the aggregation is to be a product of numbers, then the encryption system can encrypt each number by multiplying a number by the encryption of its number identifier. To decrypt the product of such encrypted numbers, the encryption system would divide the product by each of the encrypted number identifiers of the numbers used to generate the product. Also, although the encryption system is described in the context of storing encrypted numbers at a cloud data center, the encryption system may be useful even when the encrypted numbers are stored locally. If only the encrypted numbers are stored locally, a party seeking to steal the numbers would have a very limited window in which to do so (e.g., prior to the numbers being encrypted) and the encrypted numbers need not ever be decrypted. In some embodiments, the numbers may be encrypted using a cryptoprocessor, so the window may be even more limited.

FIG. 2 is a flow diagram that illustrates overall processing of a splay component of the encryption system in some embodiments. A splay component 200 receives an input set of input values and splays the input set across output sets for each distinct input value. In block 201, the component selects the next distinct value in the input set. In decision block 202, if all the distinct values in the input set have already been selected, then the component completes, else the component continues at block 203. In block 203, the component generates an output set for the selected distinct value. In block 204, the component selects the next input value starting with the first. In decision block 205, if all the input values have already been selected for the selected distinct value, then the component loops to block 201 to select the next distinct value, else the component continues at block 206. In decision block 206, if the selected input value is equal to the selected distinct value, then the component continues at block 207, else the component continues at block 208. In block 207, the component sets the output value of the output set for the selected distinct value that corresponds to the selected input value to an encryption of one and loops to block 204 to select the next input value. In block 208, the component sets the output value of the output set for the selected distinct value that corresponds to the selected input value to an encryption of zero and loops to block 204 to select the next input value.

Figure 3:
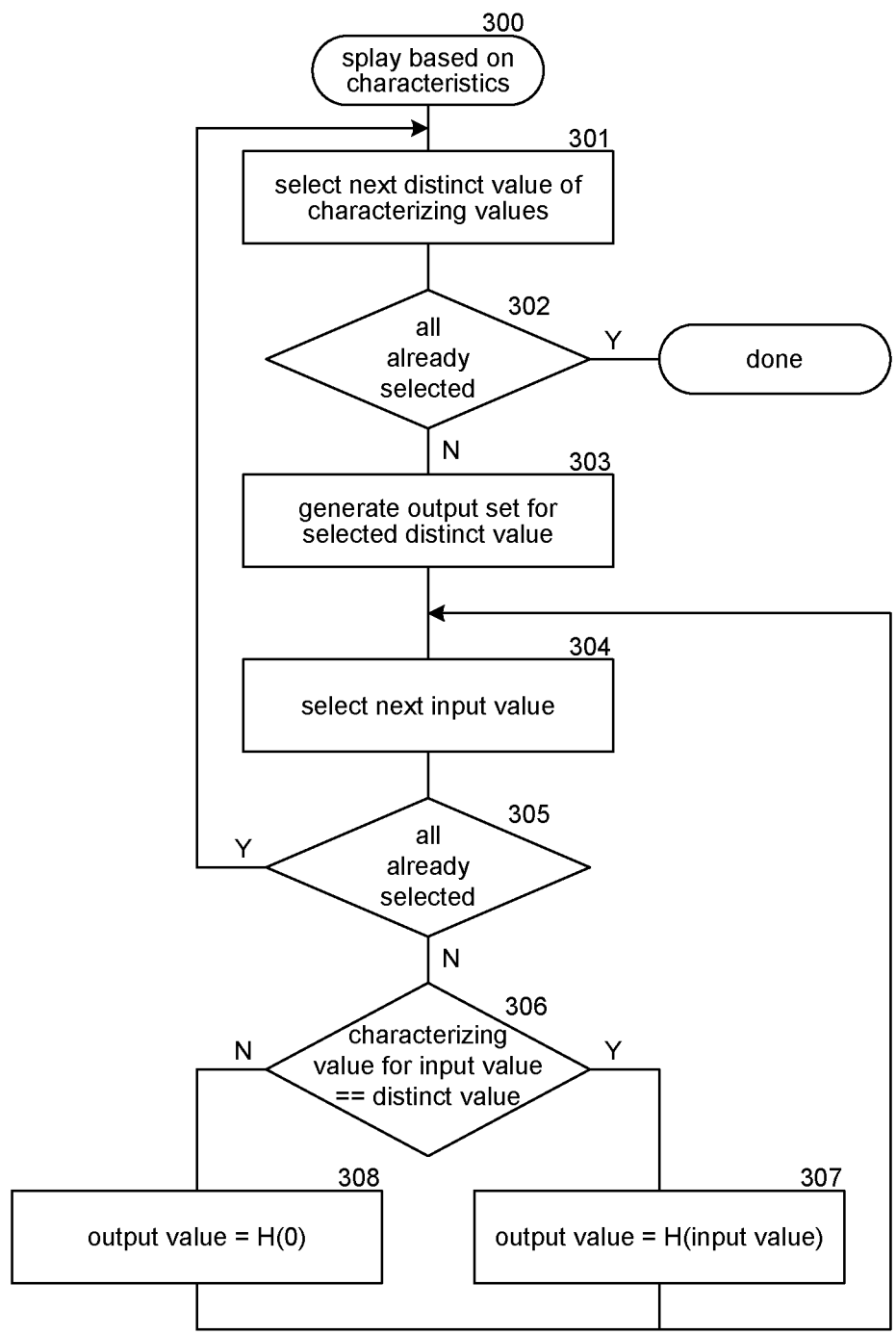
FIG. 3 is a flow diagram that illustrates overall processing of a splay based on characteristics component of the encryption system in some embodiments.

FIG. 3 is a flow diagram that illustrates overall processing of a splay based on characteristics component of the encryption system in some embodiments. A splay based on characteristics component 300 receives an input set of input values along with their characteristics and splays the input set across output sets for each distinct characteristic. In block 301, the component selects the next distinct value of the characterizing values. In decision block 302, if all such distinct values have already been selected, then the component completes, else the component continues at block 303. In block 303, the component generates an output set for the selected distinct value. In block 304, the component selects the next input value starting with the first. In decision block 305, if all the input values have already been selected for the selected distinct value, then the component loops to block 301 to select the next distinct value, else the component continues at block 306. In decision block 306, if the characterizing value for the selected input value is equal to the selected distinct value, then the component continues at block 307, else the component continues at block 308. In block 307, the component sets the output value for the output set for the selected distinct value that corresponds to the selected input value to an encryption of the input value and then loops to block 304 to select the next input value. In block 308, the component sets the output value for the output set for the selected distinct value that corresponds to the selected input value to an encryption of zero and then loops to block 304 to select the next input value.

Figure 4:
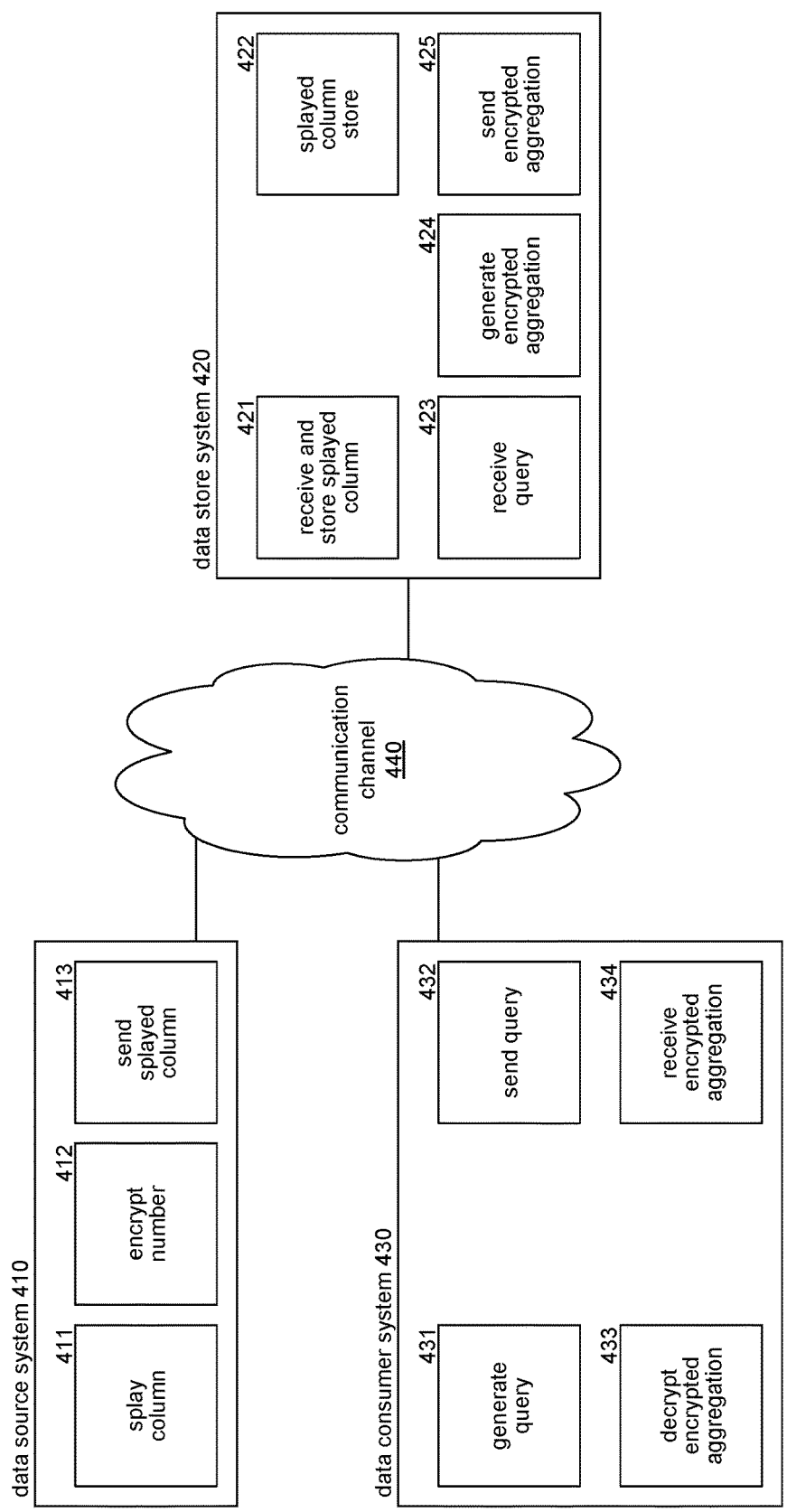
FIG. 4 is a block diagram that illustrates systems that support an encryption system in some embodiments.

FIG. 4 is a block diagram that illustrates systems that support an encryption system in some embodiments. The systems include a data source system 410, a data store system 420, and a data consumer system 430 that are connected via a communication channel 440. The data source system is a source of encrypted numbers. The data source system may include a splay column component 411, an encrypt number component 412, and a send splayed column component 413. The splay column component may be, for example, a component of a computer system of a company that employs the workers listed in the tables of FIG. 1. The splay column component may splay a column based on the values of the column or based on other characteristic values. The encrypt number component encrypts each value of sub-columns of the splayed column using a non-deterministic homomorphic encryption such as ASHE. The send splayed column component sends the encrypted values of each sub-column of a splayed column to the data store system for storage. The data store system includes a receive and store splayed column component 421, a splayed column store 422, a receive query component 423, a generate encrypted aggregation component 424, and a send encrypted aggregation component 425. The receive and store splayed column component receives a splayed column (i.e., the sub-columns) from a data source system and stores the splayed column in the splayed column store. The splayed column store stores sub-columns of splayed columns. The receive query component receives queries from data consumer systems and invokes the generate encrypted aggregation component to aggregate the encrypted numbers that match the query. The send encrypted aggregation component returns the aggregation of the encrypted numbers to a data consumer system. The data consumer system includes a generate query component 431, a send query component 432, a decrypt encrypted aggregation component 433, and a receive encrypted aggregation component 434. A user may interact with the generate query component to generate queries to submit to the data store system. The generate query component may be part of a conventional database system that supports the SQL. The send query component sends the queries to the data store system. The receive encrypted aggregation component receives the aggregations from the data store system and invokes the decrypt encrypted aggregation component to decrypt the aggregations of the encrypted numbers. Although illustrated as separate systems, a data source system and a data consumer system can be implemented on the same computing system. Also, the data store system may be implemented on the same computing system as a data source system or a data consumer system.

The computing systems on which the systems that support the encryption system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems of data source systems, data consumer systems, and data storage systems may include desktop computers, laptops, tablets, e-readers, personal digital assistants, smartphones, gaming devices, servers, point-of-sale terminals, and so on. The computing systems may also include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the encryption system. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The encryption system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the encryption system may be implemented in hardware using, for example, an application-specific integrated circuit ("ASIC").

Figure 5:
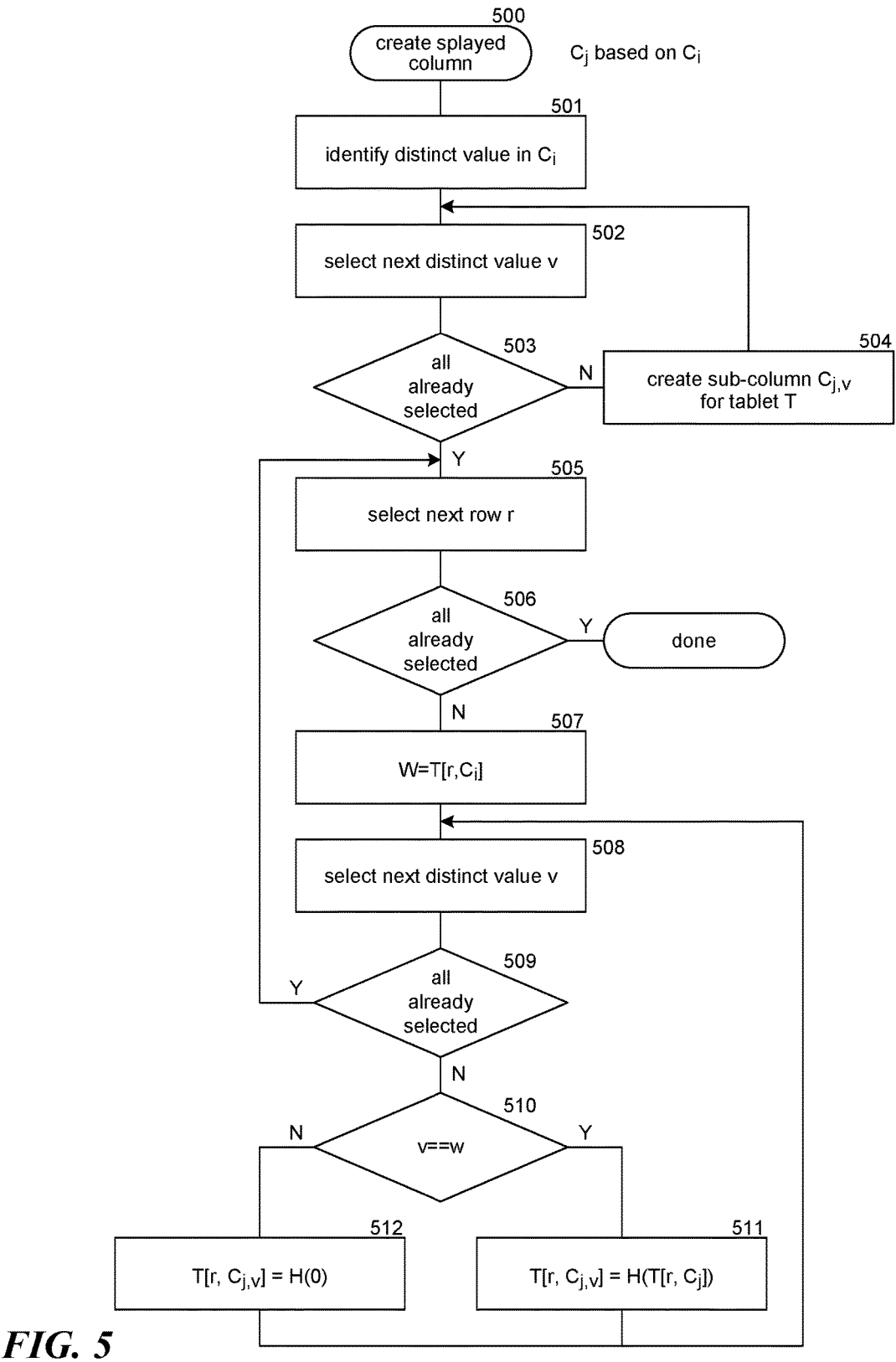
FIG. 5 is a flow diagram that illustrates processing of a create splayed column component of the encryption system in some embodiments.

FIG. 5 is a flow diagram that illustrates processing of a create splayed column component of the encryption system in some embodiments. A create splayed column component 500 receives an indication of an input column $C_j$ and a characteristic column $C_i$ of table T and splays the input column $C_j$ by generating sub-columns $C_{j,v}$ for each distinct value v of the characteristic column $C_i$. In block 501, the component identifies the distinct values v of the characteristic column $C_i$. In blocks 502-504, the component loops creating a sub-column in the table T for each distinct value. In block 502, the component selects the next distinct value v. In decision block 503, if all the distinct values have already been selected, then the component continues at block 505, else the component continues at block 504. In block 504, the component creates a sub-column $C_{j,v}$ in table T for the selected distinct value v and loops to block 502 to select the next distinct value. In block 505, the component selects the next row r of table T. In decision block 506, if all the rows have already been selected, then the component returns, else the component continues at block 507. In block 507, the component retrieves the value w from row r of the characteristic column $C_i$ as represented by T[r, $C_i$]. In blocks 508-512, the component loops setting the encrypted value in row r for each sub-column. In block 508, the component selects the next distinct value v. In decision block 509, if all the distinct values have already been selected for the selected row, then the component loops to block 505 to select the next row, else the component continues at block 510. In decision block 510, if the selected distinct value v is the same as the value w, then the component continues at block 511, else the component continues at block 512. In block 511, the component sets the value for the selected row r in the sub-column $C_{j,v}$ corresponding to the selected distinct value v to an encryption of the value in the selected row r for the input column $C_j$ and then loops to block 508 to select the next distinct value. In block 512, the component sets the value for the selected row r in the sub-column $C_{j,v}$ for the selected distinct value v to an encryption of zero and then loops to block 508 to select the next distinct value.

Figure 6:
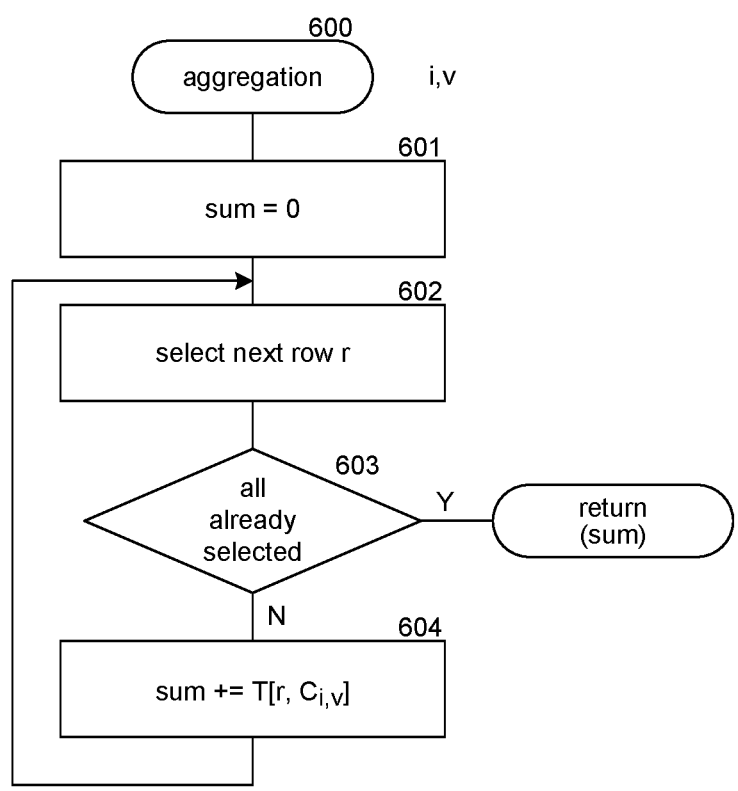
FIG. 6 is a flow diagram that illustrates processing of aggregation component in some embodiments.

FIG. 6 is a flow diagram that illustrates processing of an aggregation component in some embodiments. An aggregation component 600 receives an indication of a sub-column $C_{i,v}$ of table T and generates an aggregation of the values of that sub-column. In block 601, the component initializes the sum to zero. In block 602, the component selects the next row r of table T. In decision block 603, if all the rows have already been selected, then the component returns the encrypted sum, else the component continues at block 604. In block 604, the component adds to the sum the value from the selected row r of the sub-column $C_{i,v}$ and then loops to block 602 to select the next row.

Figure 7:
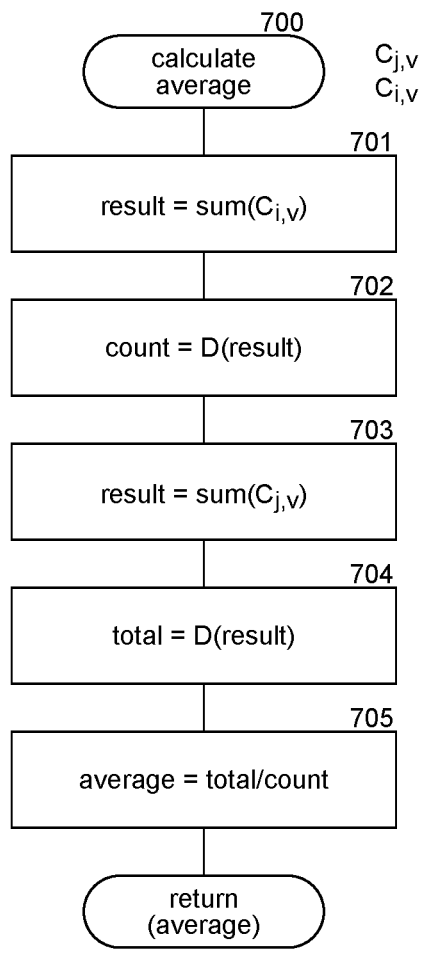
FIG. 7 is a flow diagram that illustrates processing of a calculate average component in some embodiments.

FIG. 7 is a flow diagram that illustrates processing of a calculate average component in some embodiments. A calculate average component 700 receives an indication of a measure sub-column $C_{j,v}$ and characteristic sub-column $C_{i,v}$ and calculates the average for that measure. In block 701, the component calculates the encrypted sum of the values for the characteristic sub-column $C_{i,v}$. For example, if the characteristic sub-column is gender-male, then the sum is the aggregated count of the males. In block 702, the component decrypts the result as the count. In block 703, the component calculates the encrypted sum of the values for the measure sub-column $C_{j,v}$. For example, if the measure sub-column is salary-male, then the sum is the sum of the encrypted salaries. In block 704, the component decrypts the result as the total. In block 705, the component divides the total by the count to generate the average and then returns the average.

The following paragraphs describe various embodiments of aspects of the encryption system. An implementation of the encryption system may employ any combination of the embodiments. The processing described below may be performed by a computing device with a processor that executes computer-executable instructions stored on a computer-readable storage medium that implements the augmenting system.

In some embodiments, a method performed by a computing device for storing values for aggregation is provided. The method accesses an input set with input values. For each distinct value in the input set of input values, the method generates an output set with an output value corresponding to each input value. The methods sets the output value for a corresponding input value to an encryption of an indicator of a match when the corresponding input value is the same as that distinct value and to an encryption of an indicator of no match otherwise. In some embodiments, the input set is a column of a table with an input value for each row of the table and the output sets are sub-columns of the column. In some embodiments, the encryption is a homomorphic encryption. In some embodiments, the encryption is a non-deterministic homomorphic encryption. In some embodiments, the encryption is an additively symmetric homomorphic encryption. In some embodiments, the method further generates a count of the occurrences of a distinct value by generating a sum of the output values of the output set corresponding to the distinct value and decrypting the sum. In some embodiments, the method further identifies the distinct values of the input set.

In some embodiments, a method performed by a computing device for storing values for aggregation is provided. The method accesses an input set with input values and accesses a characterizing set with a characterizing value corresponding to each input value. For each distinct value in the characterizing set of characterizing values, the method generates an output set with an output value corresponding to each input value. The method sets the output value for a corresponding input value to an encryption of the corresponding input value when the corresponding characterizing value is the same as that distinct value and to an encryption of zero otherwise. In some embodiments, the method generates a sum of the input values corresponding to a certain distinct value by generating a sum of the output values of the output set corresponding to the distinct value and decrypting the sum. In some embodiments, the method further, for each distinct value in the characterizing set of characterizing values, generates an output set with an output value corresponding to each characterizing value. In some embodiments, the method sets the output value for a corresponding characterizing value to an encryption of one when the corresponding characterizing value is the same as that distinct value and to an encryption of zero otherwise. In some embodiments, the method further generates an average input value corresponding to a distinct value by generating a total sum of the input values corresponding to the distinct value by generating a sum of the output values of the output set corresponding to the distinct value and decrypting the sum, generating a count of the occurrences of the distinct value by generating a sum of the characterizing values of the characterizing set corresponding to the distinct value and decrypting the sum, and dividing the total sum by the count. In some embodiments, the input set is a first column of a table with an input value for each row of the table, the characterizing set is a second column of the table with a characterizing value for each row of the table, and the output sets are sub-columns of the first column. In some embodiments, the encryption is a homomorphic encryption. In some embodiments, the encryption is a non-deterministic homomorphic encryption. In some embodiments, the encryption is an additively symmetric homomorphic encryption. In some embodiments, the method further identifies distinct values of the input set.

In some embodiments, a computing device for splaying an input set with input values is provided. The computing device comprises a computer-readable storage medium and a processor for executing computer-executable instructions stored by the computer-readable storage medium. The computer-readable storage medium stores the input set with the input values and a characterizing set with a characterizing value corresponding to each input value. The computer-readable storage medium also stores computer-executable instructions for controlling the computing device to, for each distinct value in the characterizing set of characterizing values, generate an output set with an output value corresponding to each input value. The computer-executable instructions are for setting the output value for a corresponding input value an encryption of the corresponding input value when the corresponding characterizing value is the same as that distinct value and to an encryption of zero otherwise. In some embodiments, the computer-executable instructions are for generating a sum of the input values corresponding to a certain distinct value by generating a sum of the output values of the output set corresponding to the distinct value and decrypting the sum. In some embodiments, the computer-executable instructions, for each distinct value in the characterizing set of characterizing values, are for generating an output set with an output value corresponding to each characterizing value. In some embodiments, the computer-executable instructions are for setting the output value for a corresponding characterizing value to an encryption of one when the corresponding characterizing value is the same as that distinct value and to an encryption of zero otherwise. In some embodiments, the computer-executable instructions are for generating an average input value corresponding to a distinct value by generating a total sum of the input values corresponding to the distinct value by generating a sum of the output values of the output set corresponding to the distinct value and decrypting the sum, generating a count of the occurrences of the distinct value by generating a sum of the characterizing values of the characterizing set corresponding to the distinct value and decrypting the sum, and dividing the total sum by the count.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A method performed by a computing device for storing values for aggregation, the method comprising:
    accessing an input set with input values associated with a first column in a first table in a database, wherein the first table includes a first plurality of columns, wherein the input set includes distinct values of the first column;
    creating a second table with a second plurality of columns, wherein the second plurality of columns includes a column for each of the distinct values and an identifier;
    for each distinct value in the input set of input values:
        for each first row in the first table:
            determining if a value of the column in the first row has a value equal to the distinct value or not equal to the distinct value;
            generating an encrypted output that indicates if the value of the column in the first row had a value equal to the distinct value; and
            storing the encrypted output in a column associated with the distinct value in a second row in the second table, wherein the second row corresponds to the first row based on the identifier.

2. The method of claim 1 wherein the encryption is a homomorphic encryption.

3. The method of claim 1 wherein the encryption is a non-deterministic homomorphic encryption.

4. The method of claim 1 wherein the encryption is an additively symmetric homomorphic encryption.

5. The method of claim 1 further comprising generating a count of occurrences for one distinct value by:
    summing the column associated with the one distinct value in the second table; and
    decrypting the sum.

6. The method of claim 1 further comprising identifying the distinct values of the input set.

7. A method performed by a computing device for storing values for aggregation, the method comprising:
    accessing an input set with input values associated with a first column in a first table in a database, wherein the first table includes a first plurality of columns, wherein the input set includes distinct values of the first column;

accessing a characterizing set with characterizing values associated with a second column in the first table in the database;

creating a second table with a second plurality of columns, wherein the second plurality of columns includes two columns for each of the distinct values, and an identifier;

for each distinct value in the input set of input values:
    for each first row in the first table:
        determining if a value of the first column in the first row has a value equal to the distinct value or not equal to the distinct value:
        generating an encrypted output that indicates if the value of the column in the first row had a value equal to the distinct value;
        encrypting a value of the second column in the first row if the value of the column in the first row had a value equal to the distinct value;
        storing the encrypted output in a column associated with the distinct value in a second row in the second table, wherein the second row corresponds to the first row based on the identifier; and
        storing the encrypted value of the second column in a third column in the second row, wherein the third column is associated with the second column from the first table.

8. The method of claim 7 further comprising:
summing the third column in the second table; and
decrypting the sum.

9. The method of claim 7 wherein the encrypted output is an encrypted one to indicate an equal value and an encrypted zero otherwise.

10. The method of claim 9 further comprising:
generating a total sum of the third column;
decrypting the total sum;
generating a sum of the second column;
decrypting the sum of the second column; and
dividing the total sum by the sum of the second column.

11. The method of claim 7 wherein the encryption is a homomorphic encryption.

12. The method of claim 7 wherein the encryption is a non-deterministic homomorphic encryption.

13. The method of claim 7 wherein the encryption is an additively symmetric homomorphic encryption.

14. The method of claim 7 further comprising identifying the distinct values of the input set.

15. A computing device for splaying an input set with input values, the computing device comprising:
a computer-readable storage medium storing:
    the input set with the input values associated with a first column in a first table in a database, wherein the first table includes a first plurality of columns, wherein the input set includes distinct values of the first column; and
    a characterizing set with characterizing values associated with a second column in the first table in the database; and
computer-executable instructions for controlling the computing device to:
    create a second table with a second plurality of columns, wherein the second plurality f columns includes two columns for each of the distinct values, and an identifier;
    for each distinct value in the input set of input values:
        for each first row in the first table:
            determine if a value of the first column in the first row has a value equal to the distinct value or not equal to the distinct value;
            generate an encrypted output that indicates if the value of the column in the first row had a value equal to the distinct value;
            encrypt a value of the second column in the first row if the value of the column in the first row had a value equal to the distinct value;
            store the encrypted output in a column associated with the distinct value in a second row in the second table, wherein the second row corresponds to the first row based on the identifier; and
            store the encrypted value of the second column in a third column in the second row, wherein the third column is associated with the second column from the first table; and
a processor that executes the computer-executable instructions stored in the computer-readable storage medium.

16. The computing device of claim 15 wherein the computer-executable instructions:
sum the third column in the second table; and
decrypt the sum.

17. The computing device of claim 15 wherein the encrypted output is an encrypted one to indicate an equal value and an encrypted zero otherwise.

18. The computing device of claim 15 wherein the computer-executable instructions:
generate a total sum of the third column;
decrypt the total sum;
generate a sum of the second column;
decrypt the sum of the second column; and
divide the total sum by the sum of the second column.

19. The method of claim 7, further comprising
for each distinct value in the input set of input values:
    for each first row in the first table:
        encrypting a value of zero if the value of the column in the first row does not have a value equal to the distinct value; and
        storing the encrypted value of zero in a fourth column in the second row, wherein the fourth column is associated with the second column.

20. The of claim 15, wherein the computer-executable instructions:
for each distinct value in the input set of input values:
    for each first row in the first table:
        encrypt a value of zero if the value of the column in the first row does not have a value equal to the distinct value; and
        store the encrypted value of zero in a fourth column in the second row, wherein the fourth column is associated with the second column.

\* \* \* \* \*